US012583765B1

(12) United States Patent
Elgendi

(10) Patent No.: US 12,583,765 B1
(45) Date of Patent: Mar. 24, 2026

(54) MULTI-UTILITY APPARATUS POWERED BY SOLAR ENERGY

(71) Applicant: United Arab Emirates University, Al Ain (AE)

(72) Inventor: Mahmoud Elgendi, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 19/215,520

(22) Filed: May 22, 2025

(51) Int. Cl.
   *C02F 1/04* (2023.01)
   *C02F 1/00* (2023.01)
   *C02F 1/14* (2023.01)
   *F24C 1/00* (2006.01)
   (Continued)

(52) U.S. Cl.
   CPC .............. *C02F 1/043* (2013.01); *C02F 1/008* (2013.01); *C02F 1/14* (2013.01); *C02F 2103/08* (2013.01); *C02F 2201/005* (2013.01); *C02F 2201/009* (2013.01); *C02F 2209/02* (2013.01); *C02F 2209/03* (2013.01); *C02F 2209/40* (2013.01); *F24C 1/00* (2013.01); *F24H 1/0072* (2013.01); *F24H 2240/09* (2013.01)

(58) Field of Classification Search
   CPC .. C02F 1/043; C02F 1/14; C02F 1/008; C02F 2209/40; C02F 2201/009; C02F 2103/08; C02F 2201/005; C02F 2209/02; C02F 2209/03; F24C 1/00; F24H 1/0072; F24H 2240/09
   See application file for complete search history.

(56) References Cited

U.S. PATENT DOCUMENTS

| | | | | | |
|---|---|---|---|---|---|
| 5,304,286 | A | * | 4/1994 | Palmer | C02F 1/16 203/1 |
| 10,046,250 | B2 | * | 8/2018 | Zebuhr | B01D 5/006 |
| 10,302,320 | B2 | | 5/2019 | Howard | |

(Continued)

FOREIGN PATENT DOCUMENTS

| | | |
|---|---|---|
| CN | 104628067 A | 5/2015 |
| CN | 111928382 A | 11/2020 |

(Continued)

OTHER PUBLICATIONS

KR 101953152 B1_English translation (Year: 2019).*

(Continued)

*Primary Examiner* — Youngsul Jeong
(74) *Attorney, Agent, or Firm* — MH2 Technology Law Group, LLP

(57) ABSTRACT

The present disclosure is directed to a multi-utility. The multi-utility apparatus includes a water distiller configured to receive and distill saltwater. The multi-utility apparatus further includes a water heater configured to receive distilled water from the water distiller and heat the distilled water. The multi-utility apparatus further includes one or more utility devices fluidly connectable to the water heater. The one or more utility devices is configured to be operable under thermosyphon effect with the water heater. The multi-utility apparatus further includes a thermoelectric generator disposed on the water distiller and the water heater. The thermoelectric generator is configured to generate electricity based on temperature difference between the water distiller or the water heater and its surroundings.

14 Claims, 5 Drawing Sheets

(51) Int. Cl.
    *F24H 1/00*          (2022.01)
    *C02F 103/08*       (2006.01)

(56)              References Cited

U.S. PATENT DOCUMENTS

| | | | |
|---|---|---|---|
| 2020/0299152 A1 * | 9/2020 | Oscarson | F24D 17/0073 |
| 2022/0048793 A1 * | 2/2022 | Ouammi | B01D 1/14 |
| 2022/0339583 A1 * | 10/2022 | Warsinger | C02F 1/008 |

FOREIGN PATENT DOCUMENTS

| | | | |
|---|---|---|---|
| CN | 216005512 U | 3/2022 | |
| KR | 101953152 B1 * | 5/2019 | F24H 9/128 |
| WO | WO-0230540 A1 * | 4/2002 | B01D 3/007 |

OTHER PUBLICATIONS

Abduhamed et al., "Design and fabrication of a heat exchanger for portable solar water distiller system", International Food Research Journal 23( Suppl), Dec. 2016, pp. S15-S22.

Chafidz et al., "Design and fabrication of a portable and hybrid solar-powered membrane distillation system", Journal of Cleaner Production, Oct. 1, 2016, vol. 133, pp. 631-647.

Saxena et al., "A High Rated Solar Water Distillation Unit for Solar Homes", Journal of Engineering, Mar. 9, 2016, 8 pages, vol. 2016, Article ID 7937696, 8 pages. doi/10.1155/2016/7937696.

* cited by examiner

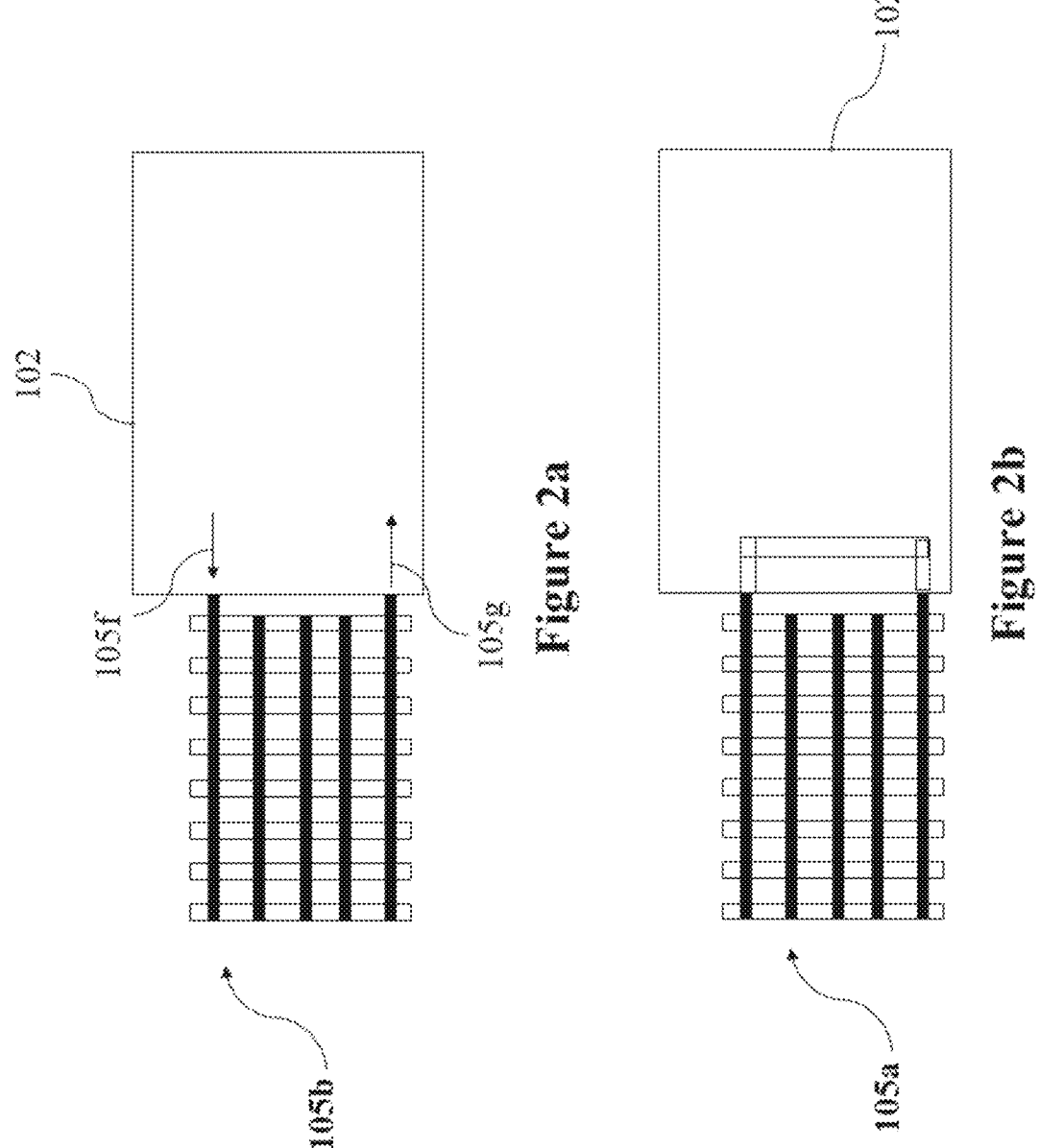

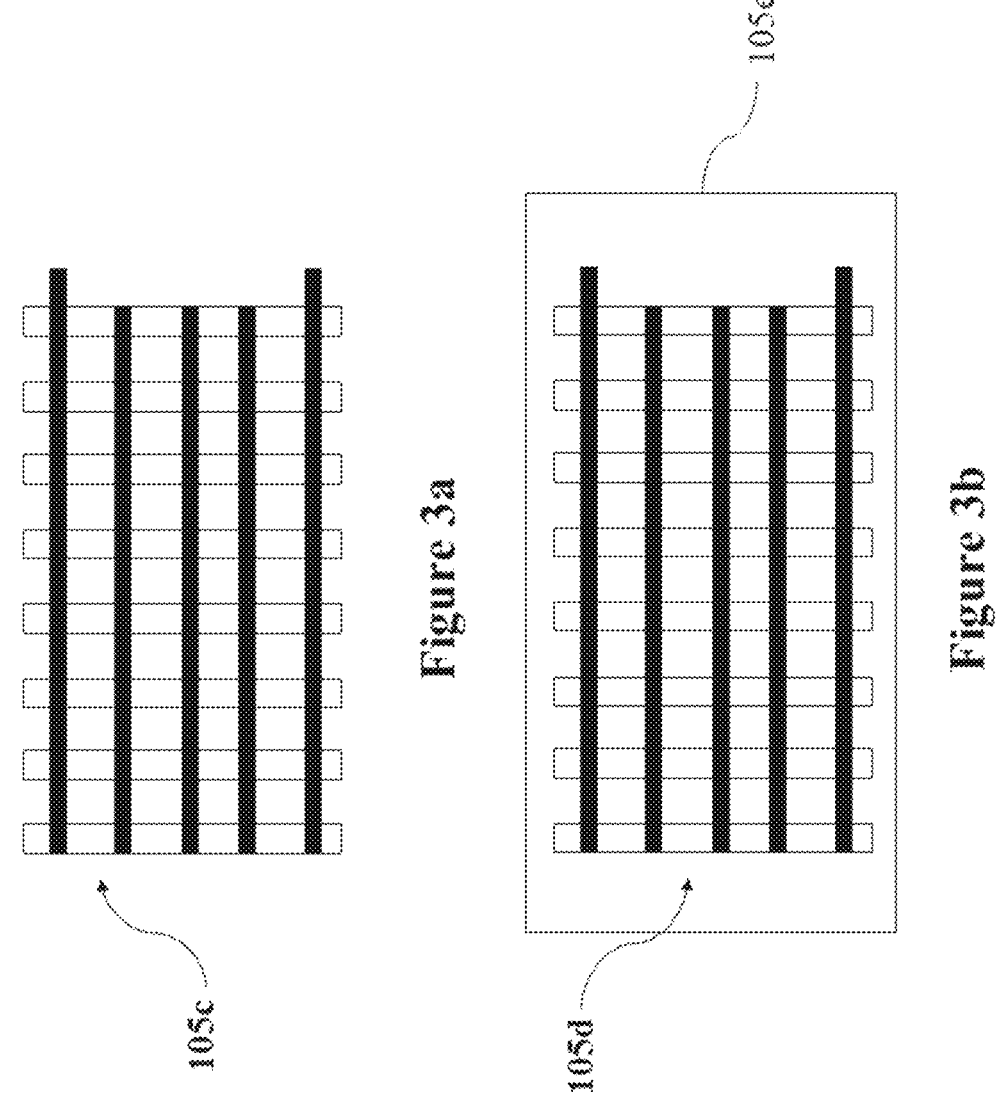

MULTI-UTILITY APPARATUS POWERED BY SOLAR ENERGY

TECHNOLOGICAL FIELD

The present disclosure in general relates to the field of solar energy powered apparatus. The present disclosure is further directed towards a multi-utility apparatus powered by solar energy.

BACKGROUND

The information in this section merely provides background information related to the present disclosure and may not constitute prior art(s) for the present disclosure.

It is well known that meeting power and water needs in remote areas can be challenging. Firstly, the challenge lies in geographic isolation for such power and water needs. That is, remote areas among other factors, lack infrastructure or access roads to transport equipment, materials, or technicians for maintenance and repairs with which either power could be harnessed or that water could be produced/extracted. Further, conventional power generation systems rely on requirement of uninterrupted power supply, due to which the same tends to be less efficient. In addition, installation and maintenance of desalination plants with power generation systems usually require high capital costs. Moreover, solutions that are designed for urban areas may not be readily adaptable in remote or geographically isolated areas, in view of requirement of skilled operators, capital costs, production to consumption (i.e., demand) ratio, and among others.

With regards to water needs, it is to be noted that water sources in remote areas vary in quality and may require customized water treatment methods. Advanced water treatment systems may not be feasible due to factors including, but not limited to, space limitations, lack of skilled personnel, or for the need of specialized parts. Accordingly, there exists a need for overcoming one or more limitations stated above and any other similar limitations associated with meeting power and water needs in remote areas. The present disclosure is directed towards overcoming and addressing the challenges outlined above.

GENERAL DESCRIPTION

A first aspect of the disclosure concerns a multi-utility apparatus [also referred to as the 'apparatus' hereinafter]. The apparatus includes a water distiller configured to receive and distill saltwater. The apparatus further includes a water heater configured to receive distilled water from the water distiller and heat or boil the distilled water. The apparatus further includes one or more utility devices fluidly connectable to the water heater. The one or more utility devices is configured to be operable under thermosyphon with the water heater. The apparatus further includes a thermoelectric generator [also referred to as 'thermo-electric generator' in the present disclosure; the terms 'thermo-electric generator and thermoelectric generator, are used interchangeably in the present disclosure] installed on the water distiller and the water heater. The thermoelectric generator is configured to generate electricity based on temperature difference between the water distiller or the water heater and surroundings.

According to a configuration of the first aspect, the one or more utility devices is a heat exchanger configured to receive heated water from the water heater.

According to a configuration of the first aspect, the heat exchanger is a closed loop heat exchanger. The closed loop heat exchanger includes a working fluid configured to exchange heat with heated water.

According to a configuration of the first aspect, the heat exchanger is an open loop heat exchanger. The open loop heat exchanger is configured to receive heated water and dissipate heat from the heated water.

According to a configuration of the first aspect, the one or more utility devices is a cooking plate disposed on at least one of the water heater or the heat exchanger. The cooking plate is configured to receive heat from at least one of the water heater or the heat exchanger.

According to a configuration of the first aspect, the one or more utility devices is a water storage reservoir fluidly connectable to at least one of the water heater or the water distiller, to receive and store fresh water.

According to a configuration of the first aspect, the apparatus includes an energy source connectable to at least one of the water distiller, the water heater, and the one or more utility devices. The energy source is configured to supply energy to at least one of the water distiller, the water heater, and the one or more utility devices.

According to a configuration of the first aspect, the energy source is at least one of a photovoltaic panel, a solar collector, an electrical heater, and a waste heat recovery unit.

According to a configuration of the first aspect, the thermoelectric generator is coupled to a partition wall of the water distiller and the water heater (may also be installed or coupled between the wall of distiller or heater and surroundings). The thermoelectric generator is configured to generate electricity based on temperature difference between the water distiller and the water heater.

According to a configuration of the first aspect, the apparatus includes a saltwater feeding module fluidly connected to the water distiller. The saltwater feeding module is configured to regulate supply of saltwater to the water distiller.

According to a configuration of the first aspect, the apparatus includes a desalination unit disposed in at least one of the water distiller and the water heater. The desalination unit is configured to drain saltwater from a lower portion of the water distiller.

According to a configuration of the first aspect, the apparatus includes a control unit communicatively connected to at least one of the water heater, the water distiller, the one or more utility devices, and the thermoelectric generator. The control unit is configured to regulate operation of at least one of the water heater, the water distiller, the one or more utility devices, and the thermoelectric generator.

According to a configuration of the first aspect, the control unit includes a flow regulation module communicatively connected to a plurality of flow regulation valves of the multi-utility apparatus. The flow regulation module includes a plurality of flow regulation valves communicatively connected to the control unit. The flow regulation module is configured to regulate flow of water between at least one of the water heater, the water distiller, the one or more utility devices, and the thermoelectric generator.

According to a configuration of the first aspect, the control unit includes a sensor module communicatively connected to a plurality of sensors of the multi-utility apparatus. The sensor module includes a plurality of sensors communicatively connected to the control unit. The plurality of sensors configured to sense one or more parameters including temperature, pressure and flowrate of water flowing between at least one of the water heater, the water distiller, the one or more utility devices, and the thermoelectric generator.

According to a configuration of the first aspect, the sensor module comprises a first sensor module disposed in the water distiller and the thermoelectric generator. The sensor module further includes a second sensor module disposed in the water heater and the one or more utility devices.

EMBODIMENTS

The present disclosure also encompasses embodiments as defined in the following numbered phrases. It should be noted that these numbered embodiments intended to add to this disclosure and is not intended in any way to be limiting.

1. A multi-utility apparatus, comprising: a water distiller, configured to receive and distill saltwater; a water heater, configured to receive distilled water from the water distiller and heat the distilled water; one or more utility devices fluidly connectable to the water heater, the one or more utility devices being configured to be operable under thermosyphon with the water heater; and a thermoelectric generator installed on the walls of the water distiller and the water heater, the thermoelectric generator configured to generate electricity based on temperature difference between the water distiller, the water heater and surroundings.

2. The multi-utility apparatus of embodiment 1, wherein the one or more utility devices is a heat exchanger configured to receive heated water from the water heater.

3. The multi-utility apparatus of embodiment 2, wherein the heat exchanger is a closed loop heat exchanger, and wherein the closed loop heat exchanger comprises a working fluid configured to exchange heat with heated water.

4. The multi-utility apparatus of embodiment 2, wherein the heat exchanger is an open loop heat exchanger, and wherein the open loop heat exchanger is configured to receive heated water and dissipate heat from the heated water.

5. The multi-utility apparatus of embodiment 1, wherein the one or more utility devices is a cooking plate disposed on at least one of the water heater or the heat exchanger, the cooking plate configured to receive heat from at least one of the water heater or the heat exchanger.

6. The multi-utility apparatus of embodiment 1, wherein the one or more utility devices is a water storage reservoir fluidly connectable to at least one of the water heater or the water distiller, to receive and store water.

7. The multi-utility apparatus of embodiment 1, comprises an energy source connectable to at least one of the water distiller, the water heater, and the one or more utility devices, and wherein the energy source is configured to supply energy to at least one of the water distiller, the water heater, and the one or more utility devices.

8. The multi-utility apparatus of embodiment 7, wherein the energy source is at least one of a photovoltaic (PV) panel, a solar collector, an electrical heater, and a waste heat recovery unit.

9. The multi-utility apparatus of embodiment 1, wherein the thermoelectric generator is coupled to a partition wall of the water distiller and the water heater, the thermoelectric generator configured to generate electricity based on temperature difference between the water distiller, the water heater and surroundings.

10. The multi-utility apparatus of embodiment 1, comprises a saltwater feeding module fluidly connected to the water distiller, the saltwater feeding module configured to regulate supply of saltwater to the water distiller.

11. The multi-utility apparatus of embodiment 1, comprises a desalination unit disposed in at least one of the water distiller and the water heater, the desalination unit configured to drain saltwater from a lower portion of the water distiller.

12. The multi-utility apparatus of embodiment 1, comprises a control unit communicatively connected to, and regulate operation of, at least one of the water heater, the water distiller, the one or more utility devices, and the thermoelectric generator.

13. The multi-utility apparatus of embodiment 1, wherein the control unit comprises a flow regulation module communicatively connected to a plurality of flow regulation valves of the multi-utility apparatus, the flow regulation module configured to regulate flow of water between at least one of the water heater, the water distiller, and the one or more utility devices.

14. The multi-utility apparatus of embodiment 1, wherein the control unit comprises a sensor module communicatively connected to a plurality of sensors of the multi-utility apparatus, the plurality of sensors configured to sense one or more parameters including temperature, pressure and flowrate of water flowing between at least one of the water heater, the water distiller, and the one or more utility devices.

15. The multi-utility apparatus of embodiment 14, wherein the sensor module comprises a first sensor module disposed in the water distiller and the thermoelectric generator, and a second sensor module disposed in the water heater and the one or more utility devices.

BRIEF DESCRIPTION OF DRAWINGS

In order to better understand the subject matter that is disclosed herein and to exemplify how it may be carried out in practice, embodiments will now be described, by way of non-limiting examples only, with reference to the accompanying drawings, in which:

FIG. 2a illustrates an open loop heat exchanger of the multi-utility apparatus of FIG. 1.

FIG. 2b illustrates a closed loop heat exchanger of the multi-utility apparatus of FIG. 1.

FIG. 3a illustrates the heat exchanger of the of the multi-utility apparatus of FIG. 1, being implemented as a room heater.

FIG. 3b illustrates the heat exchanger of the of the multi-utility apparatus of FIG. 1, being implemented as a portable heat exchanger.

DETAILED DESCRIPTION OF EMBODIMENTS

Figure 1:
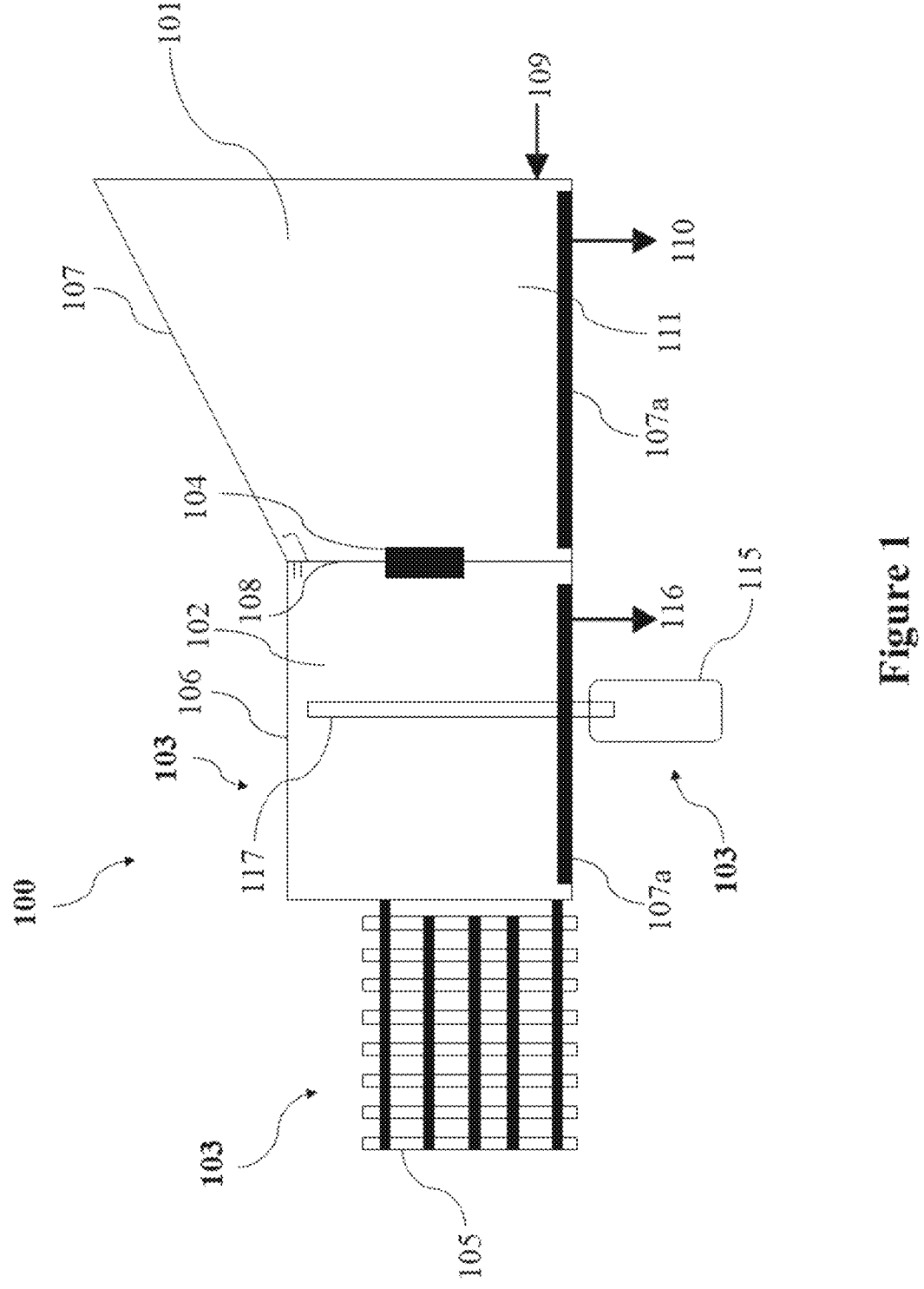
FIG. 1 illustrates a multi-utility apparatus, in accordance with an exemplary embodiment of the present disclosure.

FIG. 1 illustrates a multi-utility apparatus (100) [also referred to as the 'apparatus (100)' hereinafter], in accordance with an exemplary embodiment of the present disclosure. The term 'multi-utility apparatus' as used herein refers to such apparatus (100) [or a system or a device] that is configured to perform multiple functions and cater to multiple applications such as for power generation, for water treatment, for generation of energy required for cooking and the like. In the present disclosure, the apparatus (100) is described as being substantially powered by solar energy. However, it is to be understood that such aspect should be not considered limiting. Further, the apparatus (100) may also be powered by other energy sources in addition to the solar energy such as wind energy, geothermal energy, or by conventional fuel such as diesel, biodiesel, or kerosene. The apparatus (100) is powered by an energy source (107) including at least one of a solar collector, an electrical heater, a solar heater, and a waste heat recovery unit. In an implementation, the apparatus (100) is powered by a photovoltaic (PV) panel. The one or more energy sources, as described above, may be configured to power [supply with energy required for operation] the components/features of the apparatus (100). In an implementation, the energy source (107) is connectable to one or more components of the apparatus (100). The energy source (107) is configured to supply energy to one or more components of the apparatus (100), for operation of one or more components of the apparatus (100).

Referring now to FIG. 1, the apparatus (100) includes a water distiller (101). The water distiller (101) is configured to receive saltwater from a saltwater feeding module (109), and distill the received saltwater. The water distiller (101) is configured to purify the saltwater through distillation process. The saltwater is heated [by a heater (107a), as will be described in the following paragraphs] to produce steam, followed by condensation of steam back into liquid form, resulting in purified water. The distillation process, carried by the water distiller (101), is configured to remove impurities, contaminants, and excessive salts from saltwater, so as to make the saltwater potable and fit for domestic use. The terms 'saltwater' or 'salt water' are used interchangeably in the present disclosure. The terms 'saltwater' or 'salt water' as used herein refers to any water that is not potable. The terms 'saltwater' or 'salt water', as used in the present disclosure, includes, but not limited to, hard water that contains high mineral content, primarily calcium and magnesium. The term 'saltwater' also includes marine water found in oceans and seas, desert water that is hard, any other water sources that is not potable, and the like. Sources of saltwater includes water from seas and oceans. Sources of saltwater also include streams, ponds, wells, and the like, that contain saltwater.

As illustrated in FIG. 1, the apparatus (100) includes the saltwater feeding module (109). The saltwater feeding module (109) is configured to feed saltwater into the water distiller (101) for purification. The saltwater feeding module (109) is fluidly connected to the water distiller (101), to feed the saltwater into the water distiller (101). The saltwater feeding module (109) is configured to regulate supply of saltwater to the water distiller (101), where regulation involves flow rate, pressure, concentration of salt content in the saltwater, and the like parameters at which the saltwater is fed into the water distiller (101).

In an implementation, the saltwater feeding module (109) is a manual saltwater feeding module fluidly connected to the water distiller (101). The manual saltwater feeding module is configured to supply saltwater to the water distiller (101), based on user inputs. The user inputs may include parameters such as, but not limited to, flow rate, pressure and like, at which the saltwater is fed into the water distiller (101).

In another implementation, the saltwater feeding module (109) is an automated saltwater feeding module fluidly connected to the water distiller (101). The automated saltwater feeding module is configured to regulate supply of saltwater to the water distiller (101), based on inputs received from a control unit (112) associated with the apparatus (100).

In an implementation, the water distiller (101) includes a roof [that is, a top inner surface of the water distiller (101)], where the roof is configured to condense and collect purified water distilled by the water distiller (101). In an implementation, the roof may include apertures or increased surface area that is configured to receive, trap and/or condense the steam generated by the water distiller (101), to generate purified water.

As illustrated in FIG. 1, the apparatus (100) includes the heater (107a) disposed in the water distiller (101). The heater (107a) is configured to heat the saltwater fed into the water distiller (101), to generate steam. The apparatus (100) further includes a brine drain unit (110) disposed in the water distiller (101). Further, followed by prolonged operation of the water distiller (101), there is accumulation of salt content in a lower portion (111) of the water distiller (101). The brine drain unit (110) is configured to drain such accumulated salt content and/or high concentration saltwater [also referred to as 'brine' i.e., water with high concentration of salt] from the lower portion (111) of the water distiller (101). The brine drain unit (110) is also configured to drain such accumulated salt content and/or high concentration saltwater, from the lower portion (111) or from entire portion of the water distiller (101). Such draining of the accumulated salt content and/or high concentration saltwater is carried out during service and maintenance activities and/or after predetermined time/cycles of operation.

Continuing our reference to FIG. 1, the apparatus (100) includes a water heater (102). The water heater (102) is configured to receive distilled water from the water distiller (101), and heat the distilled water. In an implementation, the apparatus (100) may further include another heater (107a) disposed in the water heater (102). Said another heater (107a) is configured to heat the distilled water in the water heater (102), to a predetermined temperature. Operation of said another heater (107a) is regulated by the control unit (112) associated with the apparatus (100), to heat the distilled water to the predetermined temperature. In an implementation, the apparatus (100) may further include a drain outlet [not shown in the Figures] connected to a lower portion of the water heater (102). The drain outlet is configured to water from a bottom portion of the water heater (102), during service, maintenance activities and/or after completion of a predetermined time/number of cycles of operation.

Referring to FIG. 1 again, the apparatus (100) further includes a thermoelectric generator (104) [also referred to as the 'thermoelectric generator' in the present disclosure]. The thermoelectric generator (104) is configured to convert heat energy into electrical energy based on the Seebeck effect. Seebeck effect occurs when a temperature difference is created between two different conductors or semiconductors, generating an electric potential difference. The thermoelectric generator (104) includes a thermoelectric module. The thermoelectric module includes two sides viz. a hot side and a cold side. When heat is applied to one side i.e., the hot side and the cold side remains cooler, a temperature difference is established. This temperature difference causes charge carriers (electrons or holes) to move from the hot side to the cold side, creating an electric current. The movement of charge carriers generates voltage, which can be used to power external devices or charge batteries.

The thermoelectric generator (104) is disposed between or near to the water distiller (101) and the water heater (102). In an implementation, the thermoelectric generator (104) is coupled to a partition wall (108) of the water distiller (101) and the water heater (102) and other walls. Further, the thermoelectric generator (104) is configured to generate electricity based on temperature difference between the water distiller (101) and the water heater (102) and surroundings. In an implementation, the thermoelectric generator (104) includes a first side and a second side is configured to generate electricity based on temperature difference Referring to FIG. 1, the apparatus (100) further includes one or more utility devices (103). The one or more utility devices (103) are fluidly connectable to the water heater (102). The one or more utility devices (103) are configured to cater to needs of electricity generation, purified water storage, storing and supplying energy for cooking and the like. Various embodiments and implementations of the one or more utility devices (103) is described in the following paragraphs.

In an implementation, the one or more utility devices (103) is configured to be operable under thermosyphon circulation [also referred to as the 'thermosyphon effect'] with the water heater (102). In thermosyphon effect, fluid [heated water in the context of the present disclosure] circulates due to density differences caused by temperature variations. Heated water, by virtue of being less dense rises, while cool water, by virtue of being denser sinks, thereby creating a continuous circulation loop. Thermosyphon circulation/thermosiphoning effect occurs because the density of water drops with the increase of the temperature. Therefore, by the action of solar radiation absorbed, the water in the collector is heated and thus expands, becoming less dense, and rises through the collector into the top of a storage tank.

As illustrated in the exemplary implementation of FIG. 1, the one or more utility devices (103) is a heat exchanger (105) configured to receive heated water from the water heater (102). In an implementation, the heat exchanger (105) is configured to exchange heat with the heated water to generate steam. The generated steam is used to drive a turbine, which then powers an electric generator, for generation of electric power.

In accordance with an implementation illustrated in FIG. 2a, the heat exchanger (105) is an open loop heat exchanger (105b). The open loop heat exchanger (105b) is configured to receive heated water based on thermosyphon effect, and extract heat from the received heated water. The heated water, by virtue of being less dense, is stored at an upper portion of the water heater (102). The open loop heat exchanger (105b) is configured to receive heated water at inlet (105f), where such inlet (105f) is positioned in the upper portion of the water heater (102). The heated water flows into the pipes/coils of the open loop heat exchanger (105b) and dissipates heat. By losing heat, the water becomes relatively denser and sinks [flows downwards]. Thereafter, water exits the open loop heat exchanger (105b) via the outlet (105g), thereby creating a continuous circulation loop. In an implementation, the open loop heat exchanger (105b) may be a double pipe heat exchanger (105).

In accordance with an implementation illustrated in FIG. 2b, the heat exchanger (105) is a closed loop heat exchanger (105a). The closed loop heat exchanger (105a) includes a working fluid configured to exchange heat with heated water. In the closed loop heat exchanger (105a), the working fluid does not mix with the heated water, rather only exchanges heat with heated water contained in the water heater (102).

In an implementation, as illustrated in FIG. 3a, the heat exchanger (105) may be employed as a room heater (105c) [or space heater], to heat the space within which the heat exchanger (105) is accommodated. The room heater (105c) may be configured to dissipate heat to the air in the room, by natural and/or forced convection.

In another implementation, as illustrated in FIG. 3b, the heat exchanger (105) is a portable heat exchanger (105d) accommodated in a movable insulated container (105e). The heat exchanger (105) may be made portable by connecting the heat exchanger (105) and the water heater (102) by a lengthy and flexible hose, that allows for portability of the heat exchanger (105). In an implementation, the portable heat exchanger (105d) may be employed as an oven for cooking, room heating, heating or re-heating purposes.

Referring back to FIG. 1, the one or more utility devices (103) is a cooking plate (106). The cooking plate (106) may be disposed on the water heater (102) to receive heat from the water heater (102). The cooking plate (106) may be disposed on the heat exchanger (105) to receive heat from the heat exchanger (105). The cooking plate (106) may be disposed on both the water heater (102) and the heat exchanger (105), to receive heat from both the water heater (102) and the heat exchanger (105). While FIG. 1 illustrates the cooking plate (106) being disposed only on the water heater (102), such aspect should not be considered as limiting. Rather, the cooking plate (106) may be disposed on the heat exchanger (105) as well. The cooking plate (106) may be disposed on a topmost surface of the water heater (102), so as to be used for heating and/or cooking of food. In an implementation, the cooking plate (106) is made of heat conducting material. The cooking plate (106) may be configured to be disposed on top of the water heater (102), such that the cooking plate (106) may define a canopy over the water heater (102), so as to receive heat from heated water in the water heater (102). A further implementation of the one or more utility devices (103) and operation of the one or more utility devices (103) in combination with the water heater (102) and water distiller (101) is described in the following paragraphs.

Continuing our reference to FIG. 1, the one or more utility devices (103) is a water storage reservoir (115). The water storage reservoir (115) is fluidly connectable to the water heater (102) [and/or to the water distiller (101)], to receive and store purified heated water. The apparatus (100) includes a bypass conduit (117) connectable to the water heater (102). The bypass conduit (117) is configured to receive distilled water from an upper portion of the water heater (102) and route the distilled water outside of the water heater (102) and into the water storage reservoir (115). In addition to the above, the water heater (102) may also include a tapping arrangement (116) to draw out purified water for drinking and other uses.

Figures 4A, 4B:
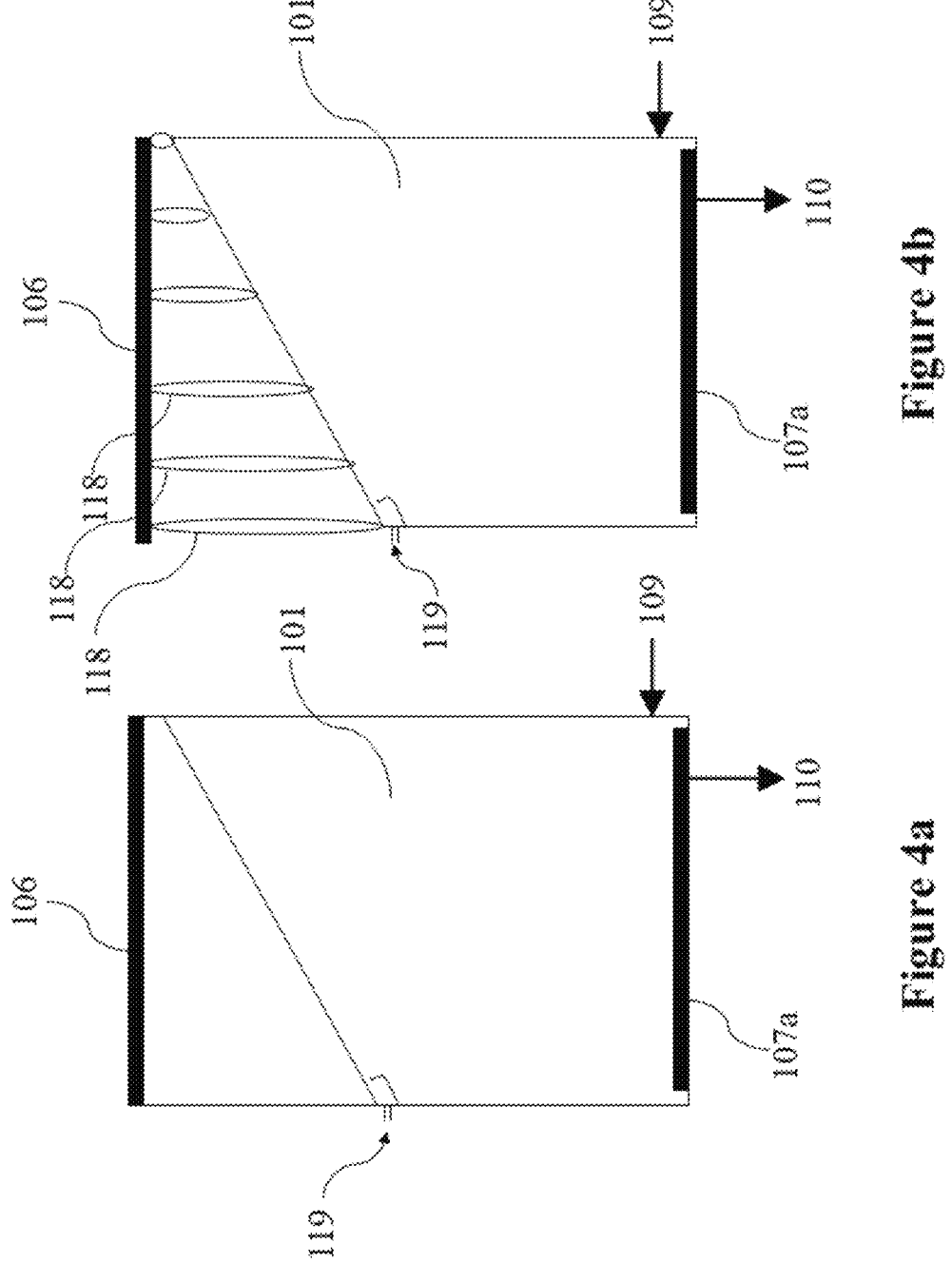
FIG. 4a illustrates a water distiller of the multi-utility apparatus of FIG. 1, in accordance with an implementation of the present disclosure.
FIG. 4b illustrates the water distiller of the multi-utility apparatus of FIG. 1, in accordance with a further implementation of the present disclosure.

FIG. 4a illustrates the water distiller (101) in accordance with a further implementation of the present disclosure. The water distiller (101) of FIG. 4a includes the cooking plate (106) disposed on a top surface of the water distiller (101), so as to form a canopy over the water distiller (101). The water distiller (101) of FIG. 4a includes a plurality of heat fins (119) disposed on a top portion thereof. The cooking plate (106) may be configured to receive heat from the heat fins (119) of the water distiller (101).

FIG. 4b illustrates the water distiller (101) in accordance with a yet another implementation of the present disclosure. Similar to the water distiller (101) of FIG. 4a, the water distiller (101) of FIG. 4b includes the cooking plate (106) disposed on the top surface of the water distiller (101), so as to form the canopy over the water distiller (101). The water distiller (101) of FIG. 4b, in addition to the heat fins (119), include heat pipes (118). The heat pipes (118) are configured to transfer heat from the water distiller (101) to the cooking plate (106), to heat the cooking plate (106). In the water distiller (101) of FIG. 4b, the heat pipes (118) may also be configured to receive heat from the plurality of heat fins (119) disposed on the top portion of the water distiller (101).

Figure 5:
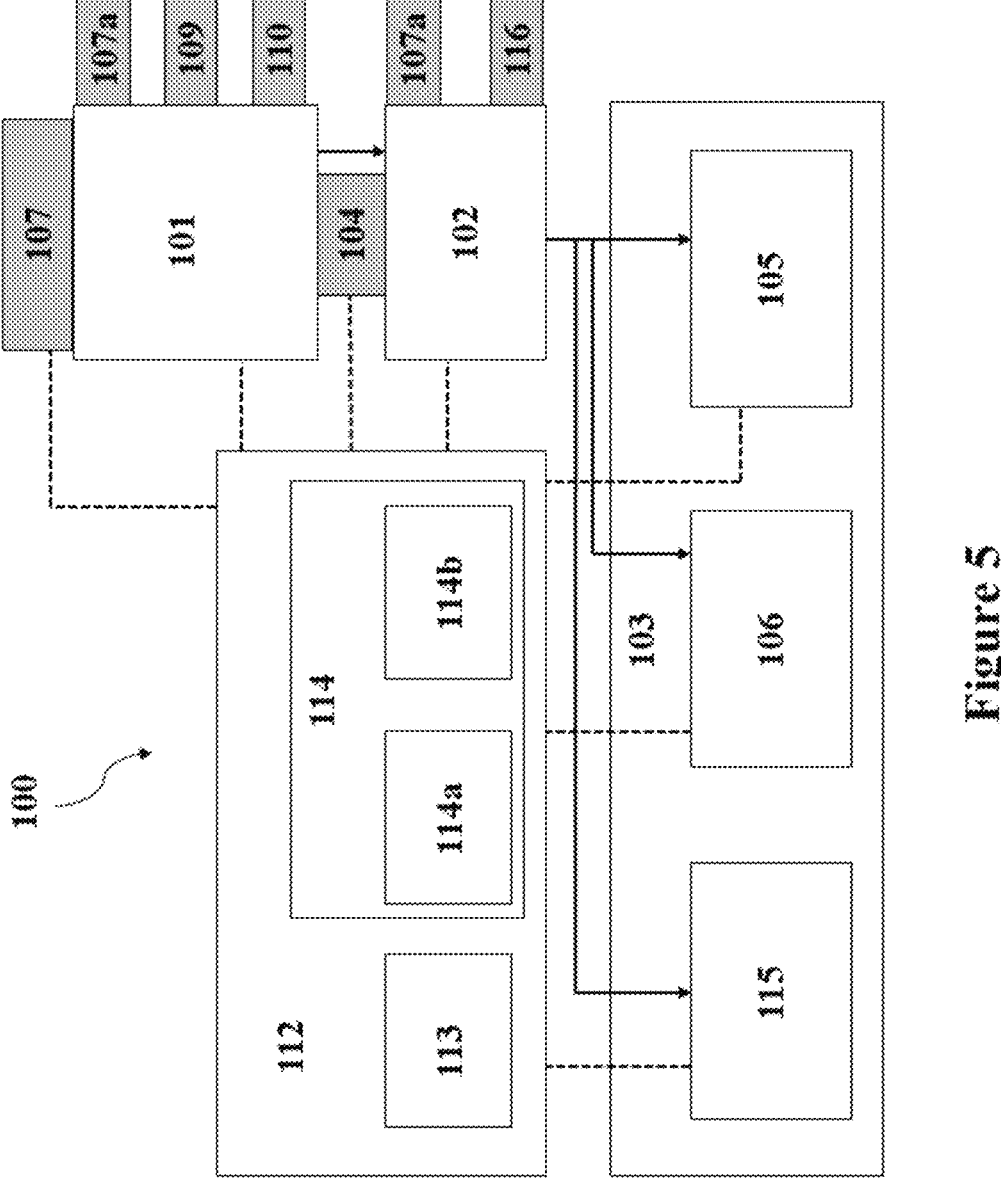
FIG. 5 illustrates a schematic block diagram of the multi-utility apparatus, in accordance with an exemplary embodiment of the present disclosure.

FIG. 5 illustrates a schematic block diagram of the apparatus (100), in accordance with an exemplary embodiment of the present disclosure. The apparatus (100) includes the control unit (112). The control unit (112) is communicatively connected to all the components of the apparatus (100). In addition to the control unit (112), the apparatus (100) without limiting to, the control unit (112), may also include, a network interface, a memory, and an Input/Output (I/O) interface [which are not shown in the Figures]. The control unit (112) may include suitable logic, circuitry, and interfaces that may be configured for regulating operation of the apparatus (100). The control unit (112) may be configured to execute program instructions associated with different operations to be executed by the apparatus (100) to regulate operation of the one or more utility devices (103). The control unit (112) may include one or more specialized processing units as explained in the following paragraphs.

As illustrated in FIG. 5, the control unit (112) is communicatively connected to at least one of the water heater (102), the water distiller (101), the one or more utility devices (103), the thermoelectric generator (104). The control unit (112) is communicatively connected to all other components of the apparatus (100) such as, but not limited to, the cooking plate (106), the water storage reservoir (115), and the automated saltwater feeding module. The control unit (112) is configured to regulate operation of at least one of the water heater (102), the water distiller (101), the one or more utility devices (103), the thermoelectric generator (104), and other components of the apparatus (100).

Referring to FIG. 5, the control unit (112) includes a flow regulation module (113). The flow regulation module (113) is communicatively connected to a plurality of flow regulation valves [not shown in the Figures] disposed in the apparatus (100). The plurality of flow regulation valves may be disposed in the water heater (102), the water distiller (101), the one or more utility devices (103), the thermoelectric generator (104), and other components of the apparatus (100). The flow regulation module (113) is configured to regulate flow of water between at least one of the water heater (102), the water distiller (101), the one or more utility devices (103), the thermoelectric generator (104), and other components receiving or providing water flow. The control unit (112) further includes a sensor module (114). The sensor module (114) is communicatively connected to a plurality of sensors [not shown in the Figures] disposed in the apparatus (100). The plurality of sensors may be disposed in the water heater (102), the water distiller (101), the one or more utility devices (103), the thermoelectric generator (104), and other components of the apparatus (100). The plurality of sensors configured to sense one or more parameters such as, but not limited to, temperature, pressure and flowrate of water flowing between at least one of the water heater (102), the water distiller (101), the one or more utility devices (103), the thermoelectric generator (104), and other components receiving or providing water flow. The one or more parameters sensed by the plurality of sensors is communicated to the control unit (112), for regulating operation of the components of the apparatus (100).

In an implementation, the sensor module (114) comprises a first sensor module (114a) communicatively connected to sensors disposed in the water distiller (101) and the thermoelectric generator (104). The first sensor module (114a) is configured to regulate operation of the water distiller (101) and the thermoelectric generator (104), based on inputs received from the sensors disposed in the water distiller (101) and the thermoelectric generator (104). The sensor module (114) further includes a second sensor module (114b) communicatively connected to sensors disposed in the water heater (102) and the one or more utility devices (103). The second sensor module (114b) is configured to regulate operation of the water heater (102) and the one or more utility devices (103), based on inputs received from the sensors disposed in the water heater (102) and the one or more utility devices (103). Further, the control unit (112) is configured to regulate operation of the components of the apparatus (100), based on inputs received from the first sensor module (114a) and the second sensor module (114b).

The aspect of including the first sensor module (114a) and the second sensor module (114b) facilitates in selective operation of the one or more utility devices (103), based on user needs. For example, the one or more utility devices (103) may be shut off [or removed] selectively, while the water distiller (101), the water heater (102), and the thermoelectric generator (104) is operated. Upon requirement, the one or more utility devices (103) may be turned on [or connected to the apparatus (100)] selectively, based on user requirement. In such implementations, the apparatus (100) may include only the water heater (102) and the water distiller (101), while the one or more utility devices (103) may be made optional, based on user requirement.

The apparatus (100) of the present disclosure is configured to cater to power and water needs of remote areas. The aspect of the apparatus (100) being powered by solar energy, solar collector or the PV panel overcomes the challenges associated with geographic isolation. The apparatus (100) of the present disclosure is configured to treat water and generate power without requiring uninterrupted power supply, making it suitable for use in remote areas off-grid regions. The apparatus (100) of the present disclosure, by virtue of being simple in construction and operation, does not require high upfront costs for installation and maintenance. The apparatus (100) of the present disclosure is suitable for use in both urban areas as well as in remote or geographically isolated areas. The apparatus (100) of the present disclosure substantially reduces need for skilled personnel and/or the need of specialized parts, by virtue of being simple in construction, easy to install, operate and maintain. The constructional configuration of the apparatus (100) of the present disclosure provides for a synergistic operation between the the water heater (102), the water distiller (101), the one or more utility devices (103), the thermoelectric generator (104), and other components of the apparatus (100). The apparatus (100) may also be utilized to cater for power and water needs in camping locations or arid regions. The apparatus (100) offers a one-stop solution for water filtration, power generation, cooking and heating, thereby eliminating need for multiple devices.

While the foregoing description sets forth various embodiments of the invention, these have been presented for purposes of illustration and are not intended to be exhaustive or to limit the invention to the precise forms disclosed. It will be understood by those skilled in the art that various changes in form and detail may be made without departing from the spirit and scope of the invention as defined by the appended claims.

The invention claimed is:

1. A multi-utility apparatus, comprising:
a water distiller, configured to receive and distill saltwater;
a water heater, configured to receive distilled water from the water distiller and heat the distilled water;
one or more utility devices fluidly connectable to the water heater, the one or more utility devices being configured to be operable under thermosyphon circulation with the water heater; and
a thermoelectric generator structurally coupled to a partition wall between the water distiller and the water heater and to walls thereof, the thermoelectric generator configured to generate electricity based on temperature difference between the water distiller, the water heater and surroundings.

2. The multi-utility apparatus according to claim 1, wherein the one or more utility devices is a heat exchanger configured to receive heated water from the water heater, the heat exchanger being operable under the thermosyphon circulation.

3. The multi-utility apparatus according to claim 2, wherein the heat exchanger is a closed loop heat exchanger, and wherein the closed loop heat exchanger comprises a working fluid configured to exchange heat with heated water.

4. The multi-utility apparatus according to claim 2, wherein the heat exchanger is an open loop heat exchanger, and wherein the open loop heat exchanger is configured to receive heated water and dissipate heat from the heated water.

5. The multi-utility apparatus according to claim 2, wherein the one or more utility devices is a cooking plate disposed on at least one of the water heater or the heat exchanger, the cooking plate configured to receive heat from the water heater or the heat exchanger.

6. The multi-utility apparatus according to claim 1, wherein the one or more utility devices is a fresh water storage reservoir fluidly connectable to at least one of the water heater or the water distiller, to receive and store fresh water, and further comprising a bypass conduit connected to the water heater and configured to receive distilled water from an upper portion of the water heater and route the distilled water to the fresh water storage reservoir.

7. The multi-utility apparatus according to claim 1, comprises an energy source connectable to at least one of the water distiller, the water heater, and the one or more utility devices, and wherein the energy source is configured to supply energy to at least one of the water distiller, the water heater, and the one or more utility devices.

8. The multi-utility apparatus according to claim 7, wherein the energy source is at least one of a photovoltaic (PV) panel, a solar collector, an electrical heater, and a waste heat recovery unit.

9. The multi-utility apparatus according to claim 1, comprises a saltwater feeding module fluidly connected to the water distiller, the saltwater feeding module configured to regulate supply of saltwater to the water distiller.

10. The multi-utility apparatus according to claim 1, comprises a desalination unit disposed in at least one of the water distiller and the water heater, a brine drain unit configured to drain saltwater from a lower portion of the water distiller.

11. The multi-utility apparatus according to claim 1, comprises a control unit communicatively connected to, and regulate operation of, at least one of the water heater, the water distiller, the one or more utility devices, and the thermoelectric generator.

12. The multi-utility apparatus according to claim 11, wherein the control unit comprises a flow regulation module communicatively connected to a plurality of flow regulation valves of the multi-utility apparatus, the flow regulation module configured to regulate flow of water between at least one of the water heater, the water distiller, the one or more utility devices, and the thermoelectric generator.

13. The multi-utility apparatus according to claim 11, wherein the control unit comprises a sensor module communicatively connected to a plurality of sensors of the multi-utility apparatus, the plurality of sensors configured to sense one or more parameters including temperature, pressure and flowrate of water flowing between at least one of the water heater, the water distiller, the one or more utility devices, and the thermoelectric generator.

14. The multi-utility apparatus according to claim 13, wherein the sensor module comprises a first sensor module disposed in the water distiller and the thermoelectric generator, and a second sensor module disposed in the water heater and the one or more utility devices.

* * * * *